Jan. 24, 1967 L. T. STOYKE 3,300,000
CONTROL SYSTEM FOR INFINITELY VARIABLE TRANSMISSION
Filed July 9, 1965 5 Sheets-Sheet 1
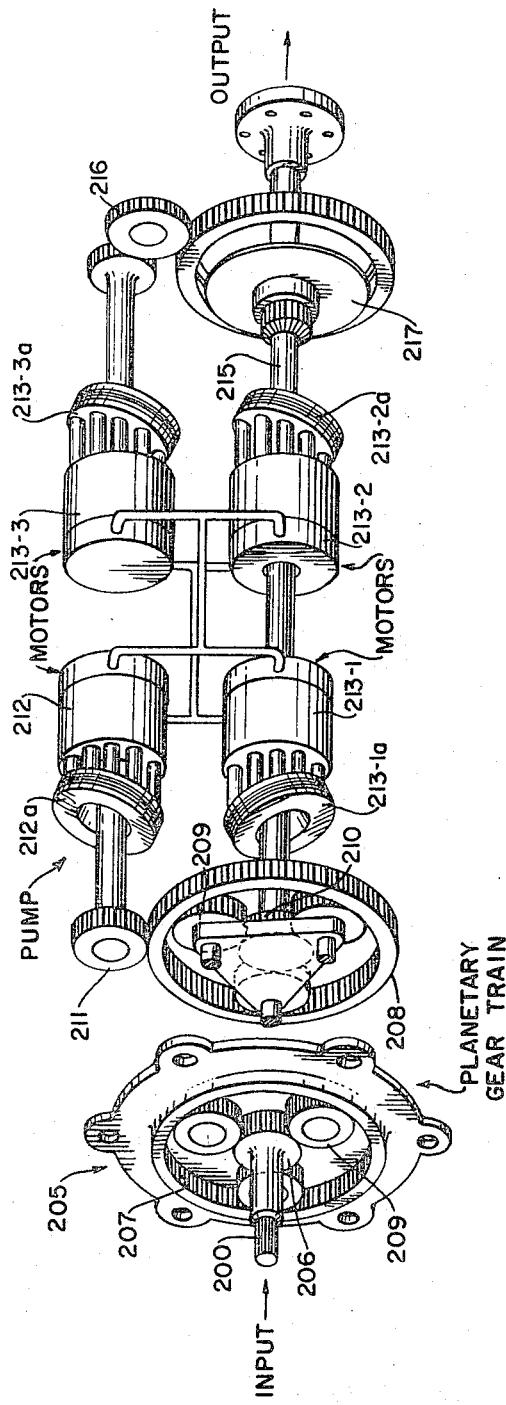
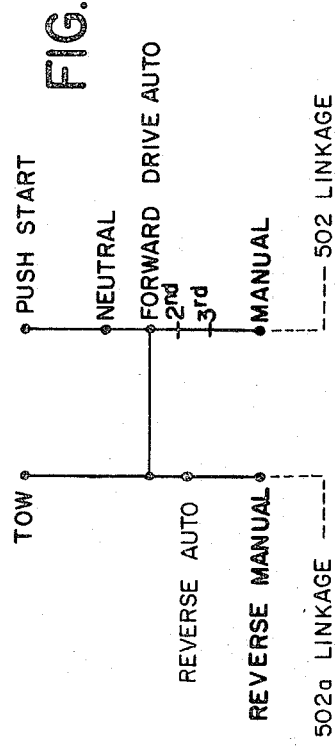
INVENTOR.
LUDWIG T. STOYKE
BY *Darby & Darby*
ATTORNEYS

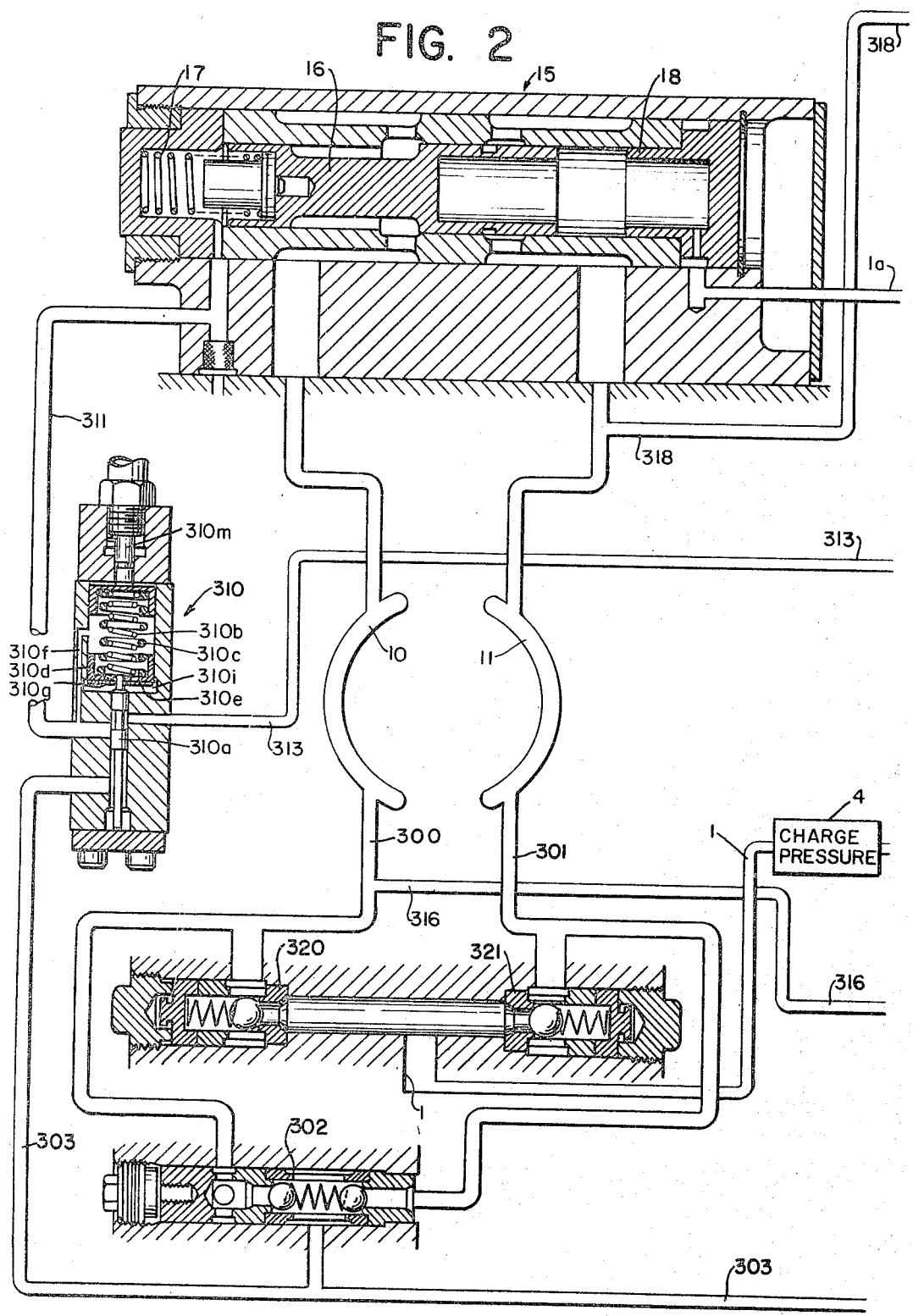

INVENTOR
LUDWIG T. STOYKE
BY
ATTORNEYS

Jan. 24, 1967  L. T. STOYKE  3,300,000
CONTROL SYSTEM FOR INFINITELY VARIABLE TRANSMISSION
Filed July 9, 1965  5 Sheets-Sheet 5

INVENTOR.
LUDWIG T. STOYKE
BY
*Darley, Darley*
ATTORNEYS

United States Patent Office 3,300,000
Patented Jan. 24, 1967

3,300,000
CONTROL SYSTEM FOR INFINITELY VARIABLE TRANSMISSION
Ludwig T. Stoyke, West Islip, N.Y., assignor to Fairchild Hiller Corporation, a corporation of Maryland
Filed July 9, 1965, Ser. No. 470,759
15 Claims. (Cl. 192—.09)

The present invention relates to control systems for infinitely variable transmissions and more particularly to control systems for infinitely variable transmissions of the hydrostatic type which are effective to automatically shift the transmission to the particular ratio most suitable to the instantaneous operating condition of the vehicle with which the transmission is used.

In the copending application of Ludwig Stoyke and Kenneth Porter, Serial No. 463,073, filed June 11, 1965, and assigned to the same assignee, a control system is disclosed for a transmission of the combined mechanical-hydraulic type. The present invention is directed to a control system of the same general type for performing the same functions but with greater reliability, increased efficiency of operation and with greater simplicity of operation.

It is an object of the present invention to provide a control system for use with a transmission of the combined hydrostatic-mechanical type.

Another object is to provide a control system for use with a transmission in which the ratio integrator type actuator controlling the operation of the hydraulic elements of the transmission is operated directly from the pressure developed by the transmission system.

An additional object is to provide a transmission control system having a linearized speed governor and amplifier.

A further object is to provide a transmission control system with an overpressure relief valve circuit.

Still another object is to provide a control system for a transmission of the combined hydrostatic-mechanical type capable of operating the transmission in a variety of modes smoothly and efficiently.

Still a further object is to provide an auxiliary mechanical regenerative vehicle braking system operating with a control system for a combined hydrostatic-mechanical transmission.

Other objects and advantages of the present invention will become more apparent upon reference to the following specification and annexed drawings in which:

FIGURE 1 is a perspective, partially diagrammatic view of the mechanical-hydraulic components of one type of transmission with which the control system of the present invention is used;

FIGURES 2, 3 and 4, is a representation of the control system, partially in schematic form and partially in cross-section, of the present invention;

FIGURE 5 is a diagram of the mode selection pattern available with the transmission of the present invention;

GENERAL

Figure 3:
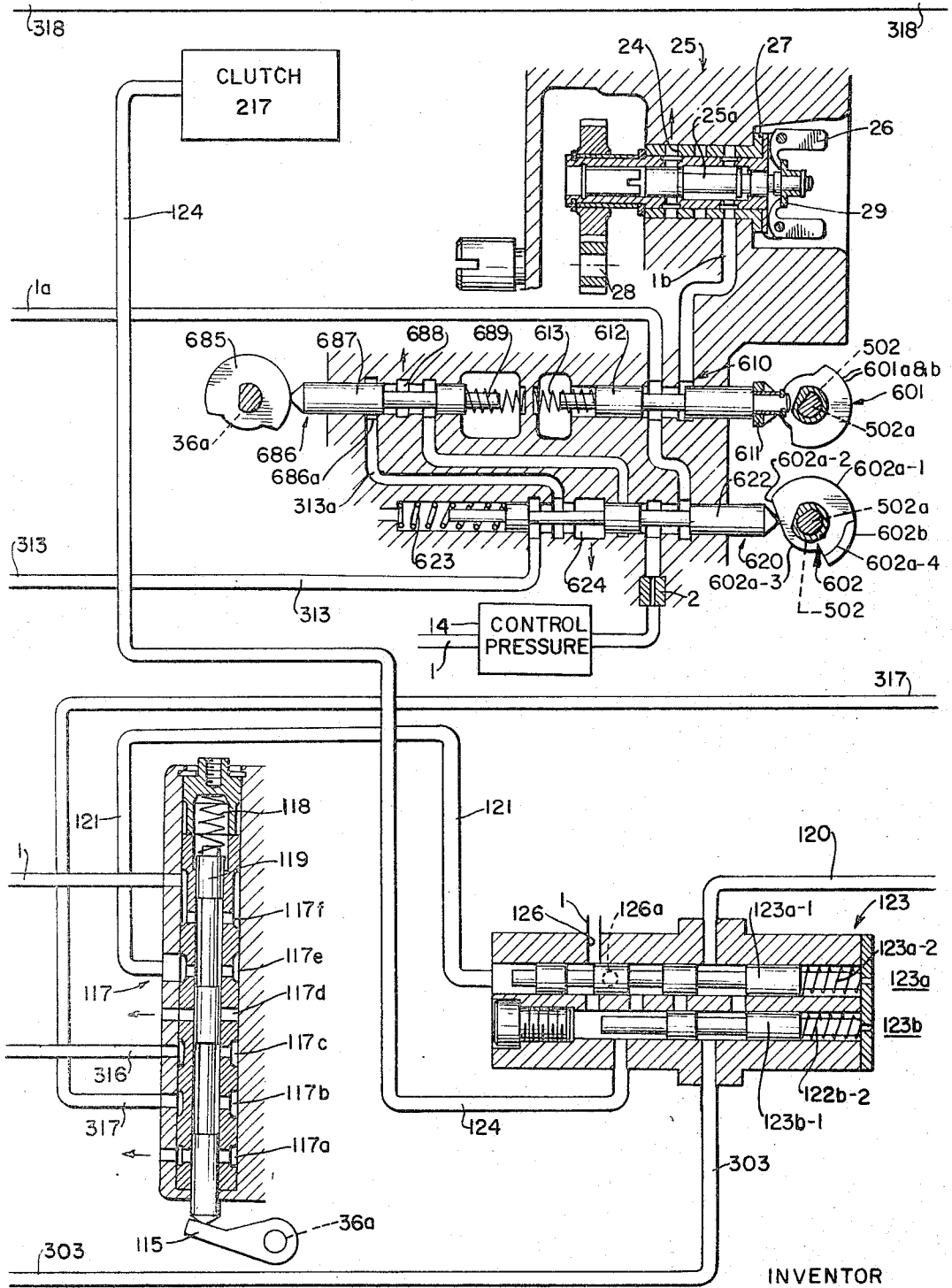

FIGURE 1 illustrates the general principles of the type of transmission with which the control system of the present invention is to be used, although it can be used with other types. The transmission of FIGURE 1 is of the split torque type in which part of the input torque is transmitted mechanically through gears. Torque multiplication is achieved by means of a variable displacement hydrostatic circuit. Automatic control of the variable displacement hydrostatic elements to match the engine power level and vehicle load is accomplished by the control system of the invention so that the engine operates at the speed of minimum fuel consumption for the power required.

The mechanical input from the prime mover is applied to a shaft 200. Shaft 200 is connected to a dividing or ratio planetary gear set comprising an input sun gear 206, a fixed input ring gear 207, a rotatable output ring gear 208 with the same number of internal teeth as the fixed gear 207, a set of planet gears 209 (all with the same number of teeth) mounted on a freely rotating carrier, and an output sun gear 210 with the same number of teeth as the input sun gear 206. If the rotatable ring gear 208 is held stationary, the output sun gear 210 rotates at the same speed as the input sun gear. This is the condition that occurs at 1:1 ratio of the transmission.

Output ring gear 208 also bears external teeth which mesh with a pinion 211 that drives a hydraulic pump 212. Pump 212 is restrained from rotating at 1:1 ratio. When the output ring gear 208 is permitted to rotate, driving the pump, the speed of the output sun gear is reduced. However, the mechanical advantage of the gears is unchanged and the output sun gear always transmits the same torque as the engine applies to the input sun gear.

Pump 212 supplies fluid (pressure) to each of three motors 213–1, 213–2 and 213–3 having the same displacement as the pump. Consequently, each motor delivers the same torque as is supplied to drive the pump. In FIGURE 1, motors 213–1 and 213–2 are splined to an output shaft 215 and rotate always at the speed of the output sun gear 210. The third motor 213–3 is connected by a three to one reduction gear 216 through a clutch 217 to the output shaft. The torque applied to the input sun gear is transmitted through the ratio planetary and the output sun gear to the output shaft. In 1:1 ratio, the third motor 213–3 clutch 217 is disengaged, its swash plate 213–3a is at zero angle, and motor 213–3 is stationary. The first and second motors 213–1 and 213–2 rotate with the output shaft but, since their swashplates are at zero angle, their displacement is zero and they accept no oil from the pump. Since the pump swashplate 212a is at its maximum angle, the pump builds hydraulic pressure but, with no place for the oil to flow, the pump is restrained from rotating and its driving pinion holds the rotatable ring gear stationary.

The transmission is down-shifted by pivoting the first and second motor swashplates 213–1a and 213–2a simultaneously, the pump remaining at full displacement. When the two motors reach their full displacement, they each deliver a torque unit to the output shaft that is equal to the pump input torque. These two torque units are added to the mechanical torque delivered through the ratio planetary. The total output torque is then three times the input torque at one-third the input speed.

At this point, the third motor 213–3 displacement is still zero and the clutch 217 is engaged under no load. The third motor swashplate 213–3a is then pivoted toward its maximum angle adding torque to the output shaft through the reduction gear 216. At full displacement of the third motor, its torque unit is multiplied three times by the reduction gear so that three torque units are added to the output shaft. This gives one mechanical torque unit, two hydraulic torque units from the first and second motors 213–1 and 213–2 and three hydraulic torque units from the third motor 213–3, a total of six torque units. The overall transmission ratio is now 6:1 at one-sixth the input speed.

Further torque multiplication is achieved by reducing the pump swashplate 212a angle to reduce its displacement. At reduced pump displacement, the motor to pump torque ratio increases which increases the torque delivered by the three motors.

Overdrive and reverse are explained in the following manner. Returning to the 1:1 ratio condition, the pump is at its maximum displacement and the motors are all at zero displacement with the third motor clutch 217 disengaged. Now, if the swashplates 213–1a and 213–2a of the first and second motors are tilted past zero to a small negative angle, the output shaft will drive these two hydrostatic elements as pumps, reversing the pressure in the hydraulic system. The pump 213 then becomes a motor and drives the rotatable ring gear 208 in the opposite direction to the input sun gear 206 causing the output sun gear and the output shaft to rotate faster than the input shaft. The torque required to drive the hydrostatic elements mounted on the output shaft is subtracted from the torque unit transmitted through the output sun gear.

Reverse operation is obtained by tilting the pump swashplate 212a to a fixed negative angle while the three motors 213 are in their maximum displacement condition and the third motor clutch 217 is engaged. This reverses the pressure in the hydraulic circuit causing the motors to run in reverse rotation. The torque multiplication achieved in reverse is less than the torque in forward drive, usually about 8:1, since the mechanical torque unit transmitted through the output sun gear is subtracted from the hydraulic torque rather than added to it the same reverse ratio compared to forward low ratio may be achieved by modifying the swashplate angle of the pump.

For a more complete description of power units of the split mechanical-hydrostatic type, reference is made to United States Patents 3,074,296 and 3,123,975 to Heinrich Ebert.

Control of the hydromechanical transmission is achieved by a hydraulic system which is responsive to engine speed, output shaft load, engine power control (accelerator pedal or throttle) and drive mode selector. It is toward the control of the hydraulic system that the present invention is directed. While the invention is described with respect to a transmission operation on a 10:1 forward ratio, 0.8:1 overdrive ratio and 8:1 reverse ratio, and other suitable ratios may be used.

Before describing the operation of the complete control system, a description is given for certain of the major components thereof together with their respective functions.

PUMP AND MOTOR

Figure 4:
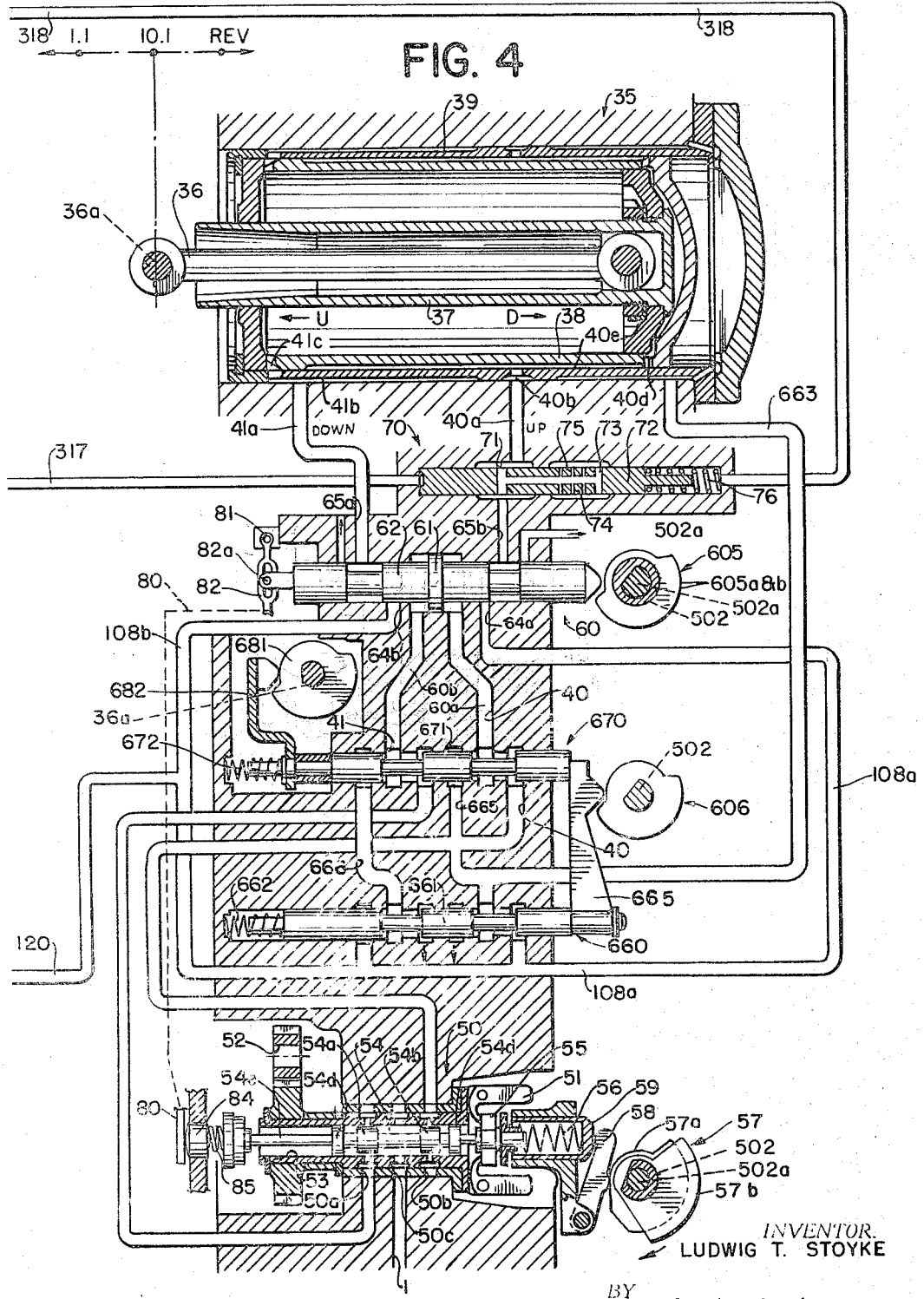

Referring to FIGURES 2–4, the high and low pressure ports, or conduits, between the pump and motor units are shown at 10 and 11 respectively. The hydrostatic pump and motor units are not shown in detail, these being conventional in the art. Each unit may comprise a plurality of pumps and a plurality of motors which are connected to the ports, or conduits, in the appropriate manner. However, in the example being considered in FIGURE 1, there is one pump and three motors. It should be understood that the high and low pressure ports, also called the fluid pressure and return ports or conduits, interchange when the system is placed into reverse or overdrive so that port 11 is at high pressure with respect to port 10.

CHARGE PRESSURE

Charge pressure, which is the main source of operating pressure for the actuator control system, shown in FIG. 4 is supplied over line 1 from a source 4 (FIG. 2) of any suitable type to operate the system. The charge pressure is preferably provided by an auxiliary engine driven pump delivering fluid, such as oil, having the required temperature and viscosity characteristics to the hydraulic systems. The control system operates on a charge pressure in the range from 175–250 p.s.i. and wherever a charge pressure line 1 is shown, this pressure is normally available. The pumps, regulators, coolers and sumps for the charge pressure system are not shown since they are conventional in the art and they, in themselves, do not form the inventive portions of the control system.

Two charge pumps are preferably provided in the transmission system, one (primary) being directly driven from the planetary carrier or input shaft and the other (secondary) driven from the ring gear which also drives the primary pump 212. The capacity of these charge pumps is such that at low ratio they are capable of providing sufficient pressure to start the control system and transmission for the vehicle at low engine speed. At high ratio (approximately 1:1) as ring gear speed is reduced to zero speed, the secondary charge pump speed is similarly reduced so that this secondary charge pump becomes stationary and does not impose a power loss to the system. Consequently, the transmission is only penalized by one charge pump creating variable delivery flow with a constant displacement pump.

CONTROL PRESSURE

Control pressure, which is lower than the charge pressure, is used to operate the valves for the mode selector portion of the control system, shown primarily in FIG. 3. The control pressure is provided by a source 14 (FIG. 3) which receives charge pressure as its input over line 1. Source 14 preferably contains a regulating valve (not shown) which operates to supply control pressure after the charge pressure requirements and oil leakage factors of the transmission have been satisfied. Any suitable conventional arrangement may be used for accomplishing this.

ENGAGING VALVE

An engaging valve 15 (FIG. 2) is used to control the transfer of fluid from the pump unit to the motor units, or vice versa, between ports 10 and 11 in a manner to prevent jerky starts when a load is engaged by the vehicle. The spool 16 of the valve is loaded by a spring 17 which moves the spool to the right in the absence of a sufficient amount of control pressure from line 1a. Control pressure is derived from the control pressure source 14 through an orifice restrictor 2, and a pressure governor 25 (FIG. 3). When spool 16 is at its right-most extremity against a stop 18 fluid transfer between ports 10 and 11 is bypassed or unrestricted, and therefore vehicle movement is prevented. When the control pressure in conduit 1a is sufficient to overcome the bias of spring 17, this pressure called the engaging pressure, spool 16 is moved to the left closing the bypass and permitting fluid transfer between the pump and motor units so that the transmission output shaft is rotated to cause vehicle motion.

PRESSURE GOVERNOR

The pressure governor 25 (FIG. 3) receives the control pressure from control pressure source 14 orifice restrictor 2 and a branch conduit 1b. This control pressure fluid is applied to a differential area of valve spool 25a. Restrictor 2 drops the higher control pressure to a lower valve. Governor 25 has a number of flyweights 26 at one end which are pivotally mounted on the outer sleeve 27 of the governor and rotated by a suitable pick-off 28 driven by the vehicle prime mover (not shown) which may be a gasoline turbine or diesel engine. The position of the flyweights is dependent upon the speed of the prime mover and when this speed is below a given r.p.m., say 700 r.p.m., the flyweights are tilted inwardly so their curved ends acting against spool shaft bearing 29 allow the spool 25a of valve 25, which is actuated by the force resulting from the control pressure acting on a differential area, to move to the left and vent a substantial portion of the control pressure from orifice 2 to the case (neutral pressure point) through a normally open vent port 24. Case pressure is indicated by an arrowhead adjacent a corresponding valve port. The use of restrictor 2 prevents dumping of the entire control pressure to case pressure. Above 700 r.p.m. the flyweights move the valve spool to the right and close the vent 24 thereby permitting the entire control pressure to pass over conduit 1a to the end of the right hand land of spool 16 of engaging valve 15.

Engaging valve 15 and pressure governor 25 operate together in the following manner. As the prime move speed increases to the transmission engaging speed (700 r.p.m.), governor 25 closes vent port 24 to case pressure. As port 24 closes the control pressure to engaging valve 15 gradually increases since less of the control pressure is dumped to case. The control pressure from governor 25 increases to the extent, and the engaging valve 15 pre-loading spring 17 is so adjusted, so that at a desired speed (preferably 700 r.p.m. for example) the engaging valve 15 starts to close due to a control pressure applied on the right end of spool 16 which is greater than the preload of spring 17. This causes the engaging valve to close the fluid bypass between the high and low pressure ports 10 and 11 and the transmission is engaged.

Spool 16 of the engaging valve is of the differential area type and the spool reflects system pressure, or working pressure, since it communicates with both the high and low pressure ports 10 and 11. As vehicle load increases with the vehicle in forward drive, the system pressure in port 10 also increases and the spool is urged to the right to hold valve 15 open to only partially bypass fluid between ports 10 and 11. Consequently, engaging valve 15 is influenced to remain open by system pressure (the pressure in the conduits 10 or 11) and spring load. As system pressure increases, a higher pressure from governor 25 is required to close valve 15. This means that as the vehicle load increases, engaging valve 15 tends to remain open longer.

To summarize the operation of this feature, at normal vehicle load where system pressure is low valve 15 is closed at 700 r.p.m. for example, but when system pressure suddenly rises, say to 2000 p.s.i., the control pressure necessary for complete closure of valve 15 may be 30 or 40 p.s.i. This gives the effect of gradual engagement of the transmission because during the pick up of driving the wheels, some of the hydraulic oil is being bypassed by valve 15 to cushion the start effect. If this were not the case starting would be abrupt and jerky.

ACTUATOR

An actuator 35 (FIGURE 4) is provided which has a movable arm 36 to control the angular position of the swashplate or plates. Arm 36 is connected to a shaft and swashplate linkage 36a to the swashplates for all of the cooperating motor or pump units 212 and 213. The actuator includes a piston 37, to which arm 36 is connected, which is slidable within an inner cylinder 38. Cylinder 38 is enclosed within an outer housing 39 and serves to produce reverse mode of operation for the transmission, as will be described. The pressure and flow signals to move arm 36, and thereby tilt the swashplates to upshift or downshift the transmission, come from respective lines 40a and 41a. The system pressure on upshift line 40a is applied to the actuator between the outer wall of cylinder 38 and the inner wall of housing 39. The upshift pressure signal enters cylinder 38 through port 40b, annulus 40c and port 40d to the right of the head of piston 37. The downshift system pressure in line 41a enters cylinder 38 at the left end of the actuator annulus 41b and port 41c and acts against the left side of the piston head. Therefore, an upshift signal moves arm 36 to the left and a downshift signal moves it to the right. Arm 36 connects to a suitable mechanical linkage 36a (not shown in detail) for moving the swashplates in the proper direction to vary the transmission ratio (e.g. from 10:1 to 1:1) in response to an upshift signal and to change it in the other direction in response to a downshift signal.

The actuator arm 36 is linked mechanically by a programmed camming arrangement, described below, to the elements controlling the hydraulic system, namely the swashplates of the pump and motors, and it represents in its travel a ratio integrator. Any one position within the stroke of arm 36 represents a transmission ratio. To maintain constant engine speed for a fixed fuel throttle position the actuator arm must be positioned to an actual displacement which will satisfy the load conditions acting on the vehicle in a manner which permits the prime mover output torque and speed to drive the vehicle at a comparable speed. The actuator is shown in the 10:1 transmission ratio position. Movement of arm 36 and piston head 37 to the left upshifts the transmission so that a 1:1 ratio is obtained with head 37 near the left-most position. The left-most position of the head 37 places the motor swashplates at a negative angle and gives an overdrive ratio, for example of 0.8:1. Moving the piston head further to the right from the 10:1 ratio position shown causes the linkage 36a to place the swashplate of the pump at a negative angle and produces reverse action of the transmission. This action is described in detail below.

The system pressure in lines 40a and 41a applied to actuator 35 through an amplifier valve 60 is higher than the charge pressure. The system pressure is derived from whichever is the high pressure port 10 or 11 of the system through a shuttle valve 302 (FIGURE 2) and applied over line 303 to a two section sequence valve 123 (FIG. 3). It passes out of sequence valve 123 to line 120 where it is applied to the input ports 64a and 64b of amplifier valve 60 over lines 108a and 108b. Since, as is explained above, the upshift and downshift system pressure signals on lines 40a and 41a are directed simultaneously to both the right and left sides of the piston head 37, the actuator at any one particular position of head 37 is continually modulated with pressure and flow signals on both sides thereof to keep the actuator linkage in a position to satisfy the fuel throttle position. Changing the valve of the upshift signal with respect to the downshift signal, or vice versa, moves the actuator and the linkage to the swashplates.

SPEED REGULATOR

Shifting of the actuator arm 36, to effect upshift or downshift of the transmission, is effected in a manner corresponding primarily to engine load (speed). The upshift and downshift signals on lines 40a and 41a to actuator 35 are controlled by a speed regulator 50 (FIGURE 4) which controls amplifier valve 60, the latter applying the upshift and downshift system pressure and flow to the actuator. The speed regulator is described first.

A number of flyweights 51 are driven through a pick-off 52 geared to the prime mover and connected to an outer sleeve 53. The flyweights 51 are pivotally mounted on the end flange of sleeve 53 and the inertia force they develop is transmitted to valve spool 54 through the bearing 55 to the spool. As the prime mover speed increases, the flyweights assume a position more nearly vertical and their curved ends act against bearing 55 to move spool 54 to the right. The inertia force produced by the flyweights is counterbalanced by a variable rate spring 56 acting against the right end of the spool shaft. The spring 56 has a variable rate such to compensate for the square of the flyweight velocity component ($V^2$) to produce essentially linear governor action.

The loading of spring 56 is set by a two section throttle cam 57, having sections 57a and 57b against which ride a follower 58. Follower 58 abuts a housing 59 holding the spring so that as housing 59 is moved to the left by follower 58, the spring pressure increases. The position of one section 57a of cam 57 is controlled by selecting a particular fuel-throttle engine setting. This is discussed in greater detail in Patent 3,139,723 to J. R. Hollowell, which is assigned to the same assignee. However, in the Holloway patent a non-linear governor is used whose $V^2$ effect is compensated for in another manner. In the present system increasing the throttle setting turns cam section 57a clockwise and increases the bias on spring 56. Cam section 57b is controlled by the drive mode selector to vary the bias on spring 56 in a manner which is described in detail below.

The speed regulator spool 54 is provided with equal valving lands 54a and 54b to respectively cover the valve downshift and upshift output ports 50a and 50b. The speed governor is supplied with constant charge pressure from port 50c over line 1 and a gradient pressure is developed across each valving land 54a and 54b. A guide land 54d is provided at each end of spool 54 to accurately center the spool within sleeve 53 and to provide a desired radial clearance between lands 54a and 54b and the respective ports 50a and 50b. Valve 50 is vented on the outer sides of lands 54a and 54b by a bore 54e.

At an equilibrium condition of the control system spool 54 is positioned so that each valving land 54a and 54b is centered about its respective output port 50a and 50b. This makes the gradient pressure ($P_g$) on each valving land 54a and 54b equal, that is $P_g$ downshift equals $P_g$ upshift. With changing speed of the prime mover, spool 54 is moved to the right or left to either increase or decrease $P_g$ downshift or $P_g$ upshift. This creates a differential pressure at output ports 50a and 50b which is applied to amplifier valve 60 to cause oil flow at system pressure to be regulated over lines 40a and 41a to actuator 35 and either downshift or upshift the transmission ratio to satisfy the load requirements of the vehicle.

In essence, regulator 50 provides an upshift or downshift signal proportional to the load of the vehicle to maintain substantially constant speed of the prime mover. As pointed out before, the rate of spring 56 and the design of ports 50a and 50b are such to make the upshift and downshift signals out of ports 50a and 50b essentially proportional and linear to the prime mover speed.

Due to the mechanical linkage between the governor 50 and the fuel throttle provided by cam 57 and its associated components, only one position of the fuel throttle establishes a particular given prime mover speed. By providing appropriate shaping for cam 57 and the proper lever ratio between the fuel throttle and follower 58 a mechanical linkage is established that always causes the prime mover to operate at its best minimum fuel consumption characteristics. A more detailed description of this is given in the aforesaid Hollowell patent.

AMPLIFIER VALVE

Amplifier valve 60 is servo element for controlling the application of system pressure in lines 40a and 41a connected to the actuator in response to upshift and downshift pressure gradient signals produced by regulator 50. The upshift and downshift pressure gradient signals at the output ports 50a and 50b of regulator 50 are applied through a reverse interlock valve 670 to input ports 60a and 60b located on opposite sides of a land 61 on amplifier spool 62. System pressure from clutch sequence valve 123 is applied by line 120 and conduits 108a and 108b to input ports 64a and 64b adjacent the ends of the large central section of spool 62. Spool 62 is kept centered with equal pressure gradient output signals from governor ports 54a and 54b applied to spool land 61. When these equal pressure gradient signals are applied to input ports 60a and 60b of the amplifier valve, system pressure input ports 64a and 64b are closed so that system pressure is kept from output ports 65a and 65b and lines 40a and 41a. The central section of the spool controls the output of system pressure from corresponding ports 65a and 65b to the lines 40a and 41a connected to the actuator in accordance with the pressure gradient signals from governor 50 applied to amplifier valve input ports 60a and 60b. As described previously, the pressure signals in lines 40a and 41a produce motion of the actuator and the swashplates.

A retarder valve 70 is located in the upshift line 40a. This valve is used during braking to retard the flow of upshift oil from the actuator and thereby modulate the downshifting of the transmission during braking. The operation of this valve is detailed below in the description of the braking mode of system operation.

SPEED REGULATOR-AMPLIFIER FEEDBACK

A mechanical feedback arrangement (FIG. 4) is provided between the spool 62 of the amplifier valve 60 and the spool 54 of the speed governor 50. This includes a lever arm 80 whose upper end is pivotally mounted to a fixed point on the control system block at point 81. A pivotal connection is made to spool 62 at the upper portion of arm 80 by a slot 82 in arm 80 and pivot pin 82a connected to the end of spool 62. The lower end of arm 80 engages a follower 84 which houses a spring 85. Spring 85 engages the spool 54. Movement of the amplifier spool 62 causes arm 80 to move thereby varying the bias of spring 85 against which governor spool 54 moves. This variation in bias of spring 85 repositions spool 54 to produce a corresponding governor signal to amplifier valve 60 to correct for overtravel of amplifier spool 62. This provides negative position feedback between the amplifier valve 60 and the speed regulator 50.

To illustrate, consider that amplifier spool 62 moves to the left to provide an upshift signal into line 40a. This moves lever arm 80 to the left, relieving bias from spring 85 and permitting speed regulator spool 54 under the fuel throttle bias spring load 56 to move to the left. This produces a downshift pressure gradient signal on output port 50a and on line 41 so that amplifier spool 62 is held in position and overtravel of spool 62 to the left in the upshift direction is prevented. A downshift motion of spool 62 to the right in the downshift direction moves lever arm 80 to the right to increase the bias on spring 85. This re-positions spool 54 to the right to produce an upshift signal from port 50b of the governor to limit overtravel of spool 62 in the downshift direction.

The use of the feedback arrangement maintains accurate amplifier spool position in response to the output of the speed regulator. This improves the gain-stability characteristics of the control system and increases the responsiveness to load changes. It also permits the system to dispense with the spring biasing of the amplifier spool used in the aforesaid application of Stoyke and Porter which introduce excessive hysteresis effects.

The speed regulator governor 50 and amplifier valve 60 system is essentially a flow control system to position the actuator 35 at any one particular ratio so that the engine is never lugged below the fuel throttle position. At 200 r.p.m., approximately, hysteresis band is selected preferably so that the engine is lugged 200 r.p.m. before obtaining an output signal change from the speed regulator to be applied to the amplifier valve so that the porting is changed sufficiently to change the flow condition leading to the actuator. If an attempt is made to increase speed and accelerate the vehicle, the fuel throttle is depressed, bias is increased on the speed regulator spool and it is shifted so that the output is a momentary downshift signal.

MISCELLANEOUS

A spool relief valve 310 is also connected to the system pressure line 303 (FIGURE 2). Valve 310 receives the high side system pressure over line 303 from either of ports 10 or 11, depending upon which portion of check valve 302 is open. Under normal operating conditions, the system pressure is blocked from line 311 by spool 310a. The spool area between the two lands is vented to case pressure over line 313 and port 624 of a valve 620, whose function is described later. The reservoir 310b is normally filled with oil due to leakage through the spool or by submerging the valve in oil, and the reservoir spring 310c sets the system pressure at which valve 310 opens.

If the system pressure exceeds a predetermined limit, which might damage the components of the transmission, then spool 310 is moved to establish a passage between line 303 and 311, that is, relief valve 310 opens. This applies pressure over line 311 to the left hand side of spool 16 of the engaging valve 15 moving it to the right and causing valve 15 to remain open and bypass the ports 10 and 11.

A spiral restrictor 310d on the follower piston 310e damps the valve action by gradually relieving the fluid trapped in line 311. This momentarily reduces the spring loading by displacing a follower piston 310e towards an adjustment means 310m. The feedback flow through a passageway 310f is directed to the spring chamber 310b and flows unrestricted through ports 310g and through a flapper check valve 310h to a chamber 310i. The feedback flow tends to keep the pilot valve 310 open to direct pressure-flow to the engaging chamber 17 to move the engaging spool 15 to open the bypass between high pressure and charge pressure. This action of regulating control oil pressure to the engaging valve causes the spool 15 to be accurately positioned to maintain maximum constant pressure during an overload condition.

Describing a typical operation of relief valve 310, a sudden load applied to the vehicle increases torque and system pressure. Engaging valve 15, which regulates gradually, is open only partially and the sudden demand for increased system pressure causes the vehicle to momentarily stall. The peak value of the system pressure is determined by the relief valve 310 which opens the bypass when the system pressure exceeds the maximum amount. Normally the time required to adjust the engaging valve is sufficient to readjust transmission ratio or engine power to produce system pressure below the value at which valve 310 opens.

To restore oil leaked from the system through the modulation of pilot relief valve 310, charge valves 320 and 321 which are simple check valves, are respectively connected to lines 300 and 301 and the charge pressure line 1. When the charge pressure applied to valves 320 and 321 exceeds the system pressure from respective ports 10 and 11, the valve connected to the lower pressure port opens and charge pressure is applied to that port to restore the lost oil to the system. Two charge valves are needed since either port 10 or 11 may be the low pressure port.

MODE SELECTOR

FIGURE 5 shows the mode selector shift pattern produced by a mode selector lever 500. The shift lever 500 controls the movement of various cams shown in FIGURES 2–4 by means of linkages 502 and 502a. The linkages are shown only schematically since the mechanical details thereof are not important. Mode selector lever 500 and linkage 502 control the operation of cam section 601a of cam 601 and cam section 602a of cam 602, all of FIG. 3. Cam section 602a has four portions designated 602a–1 (NEUTRAL), 602a–2 (FORWARD DRIVE AUTO), 602a–3 (REVERSE AUTO) and 602a–4 (PUSH START). Linkage 502 also controls cam section 605a of cam 605 and section 57b of speed regulator cam 57, both shown in FIG. 4. Linkage 502b operating with mode selector lever 500 control the operation of cam sections 601b and 602b of cams 601 and 602 of FIG. 3; section 605b of cam 605 of FIG. 4; and cam 606 of FIG. 4.

SYSTEM OPERATION

The other components of the control system are described below in the description of the operation of the control system. This operation is considered for all of the positions of the mode selector pattern of FIGURE 5. The system is shown in FIGURES 2–4 in the FORWARD AUTO mode.

I. *Neutral*

When the mode selector lever 500 is placed in the NEUTRAL position, mode selector linkage 502 moves cam 602 (FIGURE 3) counterclockwise so that spool 622 of valve 620 rides off the sloping cam portion 602a–2 to the large diameter portion 602a–1. Cam section 602 also has a minimum diameter portion 602a–3 and an intermediate diameter portion 602a–4. Spool 622 engaging cam portion 602a–4 causes the spool to move to the left against the bias of a spring 623 and causes the center land of the spool 622 to open the passage of control pressure from restrictor 2 to case pressure. This prevents control pressure build-up to the engaging valve 15 so that spool 16 cannot be moved to the left against the bias of spring 17 thereby keeping the bypass between ports 10 and 11 open.

At the same time, and in order to hydraulically lock valve 15 in the bypass position (open), the left hand land of spool 622 of valve 620 closes vent 624 to the overpressure pilot relief valve 310 (FIGURE 2) over line 313. During operation of the system, line 311 and the left hand chamber of valve 15 are filled with oil by oil leaking from charge pressure leakage past the extreme left hand land of spool 16. Before spool 622 of valve 620 is moved to the left in NEUTRAL, the oil in line 311 has a leakage path through line 313 to case pressure through vent 624 to prevent development of pressure sufficient to move engaging spool 16 to the right in line 311. When vent port 624 is closed the oil in line 311 is trapped. Since charge pressure is sealed from valve 15 to line 31 only by the clearance fit of valve spool 16, charge pressure is developed in line 311 when vent port 624 is closed trapping oil behind the left end of engaging valve spool 16. This produces a hydraulic lock so that spool 16 cannot move to the left to close the bypass and the transmission cannot engage. Therefore, placing the mode selector lever 500 in NEUTRAL, both removes the control pressure from valve 15 and hydraulically locks spool 16 so that the flow forces acting across the valving lands cannot suck the spool 16 to closed position during acceleration of the prime mover.

II. *Automatic Forward Drive*

The system is shown in FIGURES 2–4 in this mode of operation. Operation with a constant fuel throttle setting, above the bias level of spring 56, so that speed regulator 50 can act is discussed first.

As indicated above, the mode shift selector lever 500 (FIGURE 5) controls the cams of the control system of FIGURES 2–4 and therefore the mode of operation of the control system. With lever 500 in the FORWARD DRIVE AUTO position, cams 601, 602 and 605 are moved by linkage 502 to the positions shown, with spool 622 of valve 620 riding on the sloping portion 602a–2 of cam 602. Control pressure is now applied from restrictor 2 through valves 620 and 610 (FIGURE 3) to governor 25 so that the engaging valve 15 is automatically operated by the governor in the manner previously described to control the engagement of the transmission.

With lever 500 in the FORWARD DRIVE AUTO position, operation of the control system is first discussed for the condition where the transmission shifts from the lowest ratio (10:1), shown for the actuator position of FIGURE 4, to higher ratios.

As explained with respect to FIGURE 1 the transmission is provided with four hydraulic elements, three motors and a pump, hydraulically linked together to produce transmission ratio changes by means of actuator 35 controlling the swashplates. The mechanical linkage 36a from actuator 35 to the swashplate is programmed by cam and cam tracks (not shown) proportioned in a predetermined manner to provide a change in pump and motor stroke as the actuator moves. At this point it is helpful to consider how transmission ratio changes are obtained. At start up the transmission is downshifted towards its lowest ratio, for example 10:1 (hydraulic) as shown in FIGURES 2–4. At this position the cams are so designed that the pump swashplate angle is at approximately 7½ degrees and the swashplate angles for all three motors are at 15 degrees. The third motor 213–3 is engaged through clutch 217 and a 3:1 gear 216 ratio step down to the output shaft. In this configuration motors 213 are operated to obtain, insofar as hydraulic torque multiplication is concerned, a total of four hydraulic torque units out of motors 213–1 and 213–2 and two hydraulic torque units out of motor 213–3. The latter is multiplied by the gear 216 ratio so that six torque units are obtained. In this case the hydraulic torque system multiplies the prime mover torque input ten times giving the ratio 10:1 of FIGURES 2–4. In addition, due to the double planetary gear train of FIGURE 1, one mechanical torque unit is also transmitted giving a grand total torque multiplication of 11:1.

The cams and followers for the swashplates of the pump and motors are designed to vary the strokes of the pumps and motors linearly. There is no complicated cam track required and the cam tracks are essentially straight line with entrance and exit position radiused to provide a gradual entrance and exit for the cam followers. As the transmission is upshifted, due to a decrease in load and decrease in prime mover speed which produces an upshift signal from regulator 50 which in turn moves the actuator through the amplifier valve in the manner previously described, the cams are programmed to permit the pump to initially increase its stroke from 7½ degrees to 15 degrees as the actuator arm 36 moves to the left in FIGURE 4. During this period of the actuator displacement the cam followers driving the swashplates for motors 213–1, 213–2 and 213–3 are on a dwell portion of a corresponding cam so that there is no change in the displacement of the three motors.

When the pump swashplate angle is changed from 7½ degrees to 15 degrees as the transmission upshifts, meaning that the displacement of the pump is now equal to the displacement of motors 213, the hydraulic torque multiplication is changed from 10:1 (with mechanical torque 11:1) to a total of two torque units from motors 213–1 and 213–2 and one torque unit from motor 213–3, multiplied by three by the gear 216. Therefore, the total hydraulic torque multiplication in this configuration is 5:1 (6:1 with mechanical torque).

At this point of 6:1 ratio (total) the cams are programmed so that further movement of the actuator in the upshift direction does not change displacement of the pump and the pump swashplate cam follower rests on a dwell portion of its cam. The cam followers for the swashplates of motors 213–1 and 213–2 are also still on a dwell portion of their respective cams. Upshift of the actuator from the 5:1 ratio moves the swashplate angle for motor 213–3 gradually from 15 degrees to zero degrees as the transmission is upshifted. Since motor 213–3 supplies three units of torque to the output, decrease of its swashplate angle decreases this torque output. Consequently, in going from 15 degrees to zero degrees, the total hydraulic and mechanical torque output decreases from 6:1 to 3:1 (total).

As the swashplate for motor 213–3 approaches zero degrees, due to the actuator arm continuing to move to the left, a linkage connected to arm 36 actuates an interlock cam 115 at the bottom of a clutching valve 117 (FIGURE 3) and allows the cam to move downward under the bias spring force of spring 118.

In the up position of cam 115 shown in FIGURE 3, that is with the transmission in a ratio lower than 3:1, reverse system pressure is applied from lines 300 and 316 (FIGURE 2) to input port 117c of valve 117 and through output port 117b and line 37 to the left input of retarder valve 70 (FIGURE 4). The operation of retarder valve 70 is described in greater detail below. Charge pressure applied to port 117f exits through port 117e and over line 121 to the left end of clutch sequence valve section 123a of sequence valve 123. Valve 123 also has an actuator sequence section 123b. Charge pressure from line 1 entering port 126 of valve section 123a passes through the section of spool 123a–1 between the two lands on the left hand side, through the left opening between valve sections 123a and 123b, into the left hand chamber of section 123b, and out line 124 to clutch 217 to hold the clutch engaged.

At ratios between 10:1 to 6:1 the cam 115 is in the up position and the charge pressure in line 124 engages the clutch 217 so the third motor 213–3 output adds to the total torque multiplication via gear train 216. Clutch 217 is of any suitable conventional construction.

When cam 115 is moved down at ratios lower than 3:1, spring 118 in valve 117 pushes spool 119 down. This causes the upper land of spool 119 to block the charge pressure input port 117f while output port 117e and line 21 are vented to case pressure through port 117d. The left hand chamber of sequence valve 123a no longer receives charge pressure over line 121 and a spring 123a–2 moves spool 123a–1 to the left closing the passage from charge pressure input port 126 of valve 123a to the left hand section of valve 123b to the left of spool 123b–1 and to line 124. At the same time port 126a is opened connecting line 124 leading to the clutch 217, to vent the charge pressure to case thereby disengaging the clutch and stopping rotation of motor 213–3.

In the condition of 3:1 ratio the pump cam follower rides on a dwell position. As the transmission is upshifted still further from the 3:1 ratio the cams operate to reduce the stroke of motors 213–1 and 213–2, by reducing their swashplate angles, while maintaining the pump on dwell position at 15 degrees. The actuator continues to move to the left in the upshift position and the motors 213–1 and 213–2 gradually reduce their stroke. This means that the torque multiplication from the hydraulic system is gradually reduced until motors 213–1 and 213–2 finally approach zero stroke. At this time the pump can no longer deliver hydraulic oil to the motors because they can no longer accept oil, thereby providing a hydraulic lock. During this time, when the transmission is reaching a higher and higher ratio, the pump, for a given prime mover input speed, and a constant fuel throttle position, gradually decreases speed as the motors 213–1 and 213–2 capacity for accepting oil decreases, so that at zero motor stroke there is also zero pump speed. Under these conditions there is no hydraulic multiplication and the entire drive is mechanical at a 1:1 ratio. Full prime mover torque is delivered mechanically in a highly efficient manner, the only inefficiencies being caused by the friction of the rotating members and leakages losses due to reaction pressure within the transmission.

If upshift is continued, the actuator linkage cam drives the swashplates of motors 213–1 and 213–2 to negative angles. This has the effect of driving the motors as pumps. The motors 213–1 and 213–2 then deliver oil to the pump 212 and cause the ring gear of the planetary system, which normally drives the pump 212, to rotate in a direction opposite its normal rotation to increase the output speed. This provides overdrive. An overdrive ratio of 0.8:1 is achieved in the illustrative system being described.

In downshifting, caused by increased load and decrease in prime mover speed, the reverse sequence of events occur from the 1:1 ratio down to the lower ratios. Here the sequence valves 123a and 123b operate to engage the clutch for the third motor 213–3. As the vehicle load increases and prime mover speed decreases, causing the speed regulator 50 to produce a downshift signal and thereby move actuator arm 26 to the right toward the lower ratio positions, the transmission goes in sequence from overdrive to direct drive (1:1) and gradually to 3:1 as the swashplates for motors 213–1 and 213–2 are moved. At the 3:1 ratio position the interlock cam 115 is moved up by the actuator linkage to actuate the spool 119 of clutching valve 117 upwardly. This permits charge pressure to be directed to clutch 217 over line 124 in the manner described above to engage the clutch 217 and the third motor 213-3.

When downshifting, and at ratios higher than 3:1, spool 119 is in the downward position blocking charge flow from line 121 and venting this to case pressure thereby permitting spool 123a-1 of valve 123 to move to the left under the bias of spring 123a-2. This also blocks charge pressure at input port 126 from line 124 and causing spool 123b-1 to move to the left under the bias of spring 123b-2. System pressure is still permitted to flow through the second right passage between sections 123a and 123b to line 120 and the actuator. This keeps the actuator operating.

Since valve section 123b can never block charge pressure flow present at input port 126, valve section 123a functions as a pilot valve in supplying charge pressure to the clutch. This pilot function is described in greater detail below in the section dealing with engine braking.

When clutch 217 is engaged, with motor 213-3 at zero stroke, and with the transmission continuing to downshift, the cams cause a change of the swashplate angle of the third motor to gradually increase it from zero degrees to 15 degrees. With the swashplate of the pump at 15 degrees and the motors 213-1 and 213-2 at 15 degrees, third motor 213-3 eventually reaches 15 degrees, and a 6:1 total ratio is provided. The transmission can continue to downshift in the manner already described for upshift operation. With the pump and all motors at 15 degrees in a 6:1 ratio, as the actuator further downshifts the pump angle gradually changes its stroke from 15 to 7½ degrees increasing the system pressure for final torque multiplication of 11:1.

This completes the upshift and downshift operation at constant fuel throttle position. The transmission will upshift and downshift at all fuel throttle positions above the fuel throttle bias of spring 56. Essentially this system tries to maintain constant engine speed by changing the output in accordance with variations in load.

III. *Forward automatic—Change of throttle setting*

The next operating sequence to be considered is that of increasing or decreasing the throttle setting. Referring now to the speed regulator (FIGURE 4), cam 57 has two independently operated sections 57a and 57b. Section 57a is linked to the throttle while section 57b is linked to the mode selector lever 500. Cam sections 57a and 57b are proportioned so that the minimum diameter of braking cam 57b is greater than the minimum diameter of the throttle cam 57 and the maximum diameter of the throttle cam 57a is greater than the maximum diameter of always some bias applied to spring 56 of the regulator by the braking cam 57b. As shown in FIGURE 4, there is cam section 57b to prevent the transmission from upshifting except at designated engine speed.

With the load the same, application of more fuel throttle instantaneously applies more bias to spring 56 of the governor before the governor can respond to the increased prime mover speed. This momentarily causes the transmission to downshift. However, as the governor 50 senses the speed increase of the prime mover, and the fuel throttle is kept at the new setting, the governor begins to produce an upshift signal. This causes the transmission to upshift so that the vehicle speed is increased. When vehicle equilibrium is reached a transmission ratio is established to maintain constant that engine speed associated with the new throttle setting. By the physical linkage between engine fuel throttle and transmission governor and proper lever ratios, a transmission ratio for a given fuel throttle is always established at the best fuel economy.

With the load the same and the fuel throttle setting decreased, cam 57a is moved to provide less bias. This causes the transmission to upshift and decrease the prime mover speed momentarily. As the governor senses this prime mover speed change it commences to produce a downshift signal. This causes the transmission to downshift to a lower ratio to maintain the given engine speed. Again the downshifting and resulting vehicle speed is achieved at the best fuel economy for the particular throttle setting due to the mechanical linkage between the fuel throttle and governor 50.

As explained above, the loading rate of spring 56 and the porting design of valve 50 are selected so that the pressure gradients produced across output ports 50a and 50b of governor will be proportional and vary linearly in accordance with the prime mover speed.

Due to the loading of the pump and motor swashplates the control system has a normal tendency to produce an upshifting action on actuator 35. In the copending application of Stoyke and Porter referred to above, an unequal spring biasing of the amplifier valve spool 62 was provided by two springs of unequal rate to decrease the upshift gain while increasing the downshift gain of the system. In the control system of the copending application, it also was necessary to arrange the amplifier valve to vent the downshift line 41a to the actuator to case pressure when shifting from AUTO REVERSE to AUTO FORWARD so that the actuator piston 37 could move to the left. In this initial position, with a balanced output from the governor 50, the condition for modulating the actuator travel, causes the downshift spring to control the upshifting of the transmission. Also in order to balance the gain characteristics of the system to up and downshifting, a low rate downshift spring is selected to produce a proportionally greater amplifier spool displacement for an equal up and downshift signals from the governor. With the transmission fully downshifted, which is the normal condition to vehicle start up, an increase in engine speed produced an upshift signal on line 40. This signal positioned the amplifier spool to provide an upshift flow in line 40a to the actuator while venting the downshift side to case pressure. Inasmuch as the normal loading from the pump and motor through the actuator linkage and lever assembly 36a produces an upshift force the actuator, by venting the downshift side of the piston 37, moves rapidly to upshift the transmission. As a consequence, a slight error from the governor becomes amplified by the intrinsic high gain characteristic of the upshifting action. Also in the control system of the aforesaid application only a substantial speed change of the prime mover causes the high rate upshift spring to be effective. As a result, the system overcorrects during upshifting so that instability is encountered during certain condition of drive motion. It also becomes difficult to accelerate the vehicle rapidly without encountering surging under these conditions.

In the control system of the present invention, the variable biasing upshift and downshift springs are eliminated. Instead, spool 62 of amplifier valve 60 is positioned only by the differential pressure applied to spool lands 61. Spool 62 is, of course, mechanically connected through the feed back arm 80 to the governor spool 54. During an equilibrium condition, when the pressure gradients from ports 50a and 50b of governor 50 are the same, upshift and downshift system pressure input ports 64a and 64b are blocked. With proper porting area proportioned to compensate for the normal difference in gain characteristic of the actuation system a more accurate and faster amplifier spool position and response is established for a given output of the governor than can be produced by only a fully spring biased amplifier spool design. The design of the present system achieves a stable and responsive control system so that accurate transmission ratios are instantly possible to match the load and speed changes of the vehicle.

Since amplifier spool 62 is supplied directly with system pressure, which varies in accordance with vehicle load, negative feedback is effectively provided to the amplifier valve 60 to further improve the response and system stability. For example, when downshifting a momentary increase in system pressure is experienced due to the increased load before a ratio change is produced. The higher control pressure level produces a higher oil flow to the actuator for a given governor output signal. Consequently, a faster response is produced. Should the actuator be over-regulated to downshift the transmission too far for the load, a decrease in system pressure results that tends to decrease the rate of oil flow to the actuator to effectively retard the overtravel of the actuator. If an undertravel is experienced the higher system pressure tends to correct this condition without necessitating first a control position change of governor 50. During an upshift mode caused by sudden application of the fuel throttle the transmission momentary downshifts to allow the prime mover to increase in speed. This action reduces system pressure to retard the oil flow to the actuator and prevents undertravel of the actuator. As the engine speed rises so does the system pressure and with the amplifier spool positioned for upshifting flow instantaneously the sudden engagement of the load causes a surge pressure which is immediately utilized to upshift the actuator. The actuator moves toward the upshift direction slightly lagging the governor output. The lower ratio for the given rate of change now produces a lower system pressure so that the oil flow from the amplifier spool is retarded to reduce the high upshift gain of the actuator system.

The use of the negative feedback provided by the system pressure as well as the mechanical negative feedback of lever arm 80 provides a highly stable control system from which the unequal rate biasing springs of the control system of the aforesaid application may be eliminated.

IV. Braking

A. *Coasting stops.*—During coasting or a braking stop, the vehicle drives the transmission so the hydraulic motors 213 become pumps and supply fluid to the primary pump 212 which is acting as a motor to rotate the engine. With a constant compression ratio engine, as is generally used, a constant restrictive or braking torque is reflected to the pump and motor units.

Consider a coasting stop taking place after the vehicle has been moving with the transmission at a high ratio, above 3:1. The first thing to occur is a decrease in engine speed since the driver takes his foot off the accelerator pedal. Speed regulator 50 is set so that below a certain engine speed, say 1200 r.p.m., a downshift signal is produced. As the transmission starts to downshift, first the two motors 213–1 and 213–2 splined to the output shaft increases their swashplate angles to that required for a 3:1 drive ratio. The increasing flow from these two motor/pump units causes the pump/motor unit 212 to accelerate. The inertia load of these hydraulic elements, the inertia load of the engine and the inherent engine compression ratio impart an increasing braking torque. As long as engine speed for a normal coasting stop does not exceed 1200 r.p.m. downshifting of the transmission continues. Downshifting below third motor/pump unit 213–3 cut-in is initiated by the clutching valve 117 actuated by the interlock cam 115. The opening of the clutching valve 117 by cam 115 pushing upward allows charge pressure from port 117e to be directed over line 121 to the sequence valve 123. This valve is adjusted to produce a momentary dwell to the actuator travel, to hold the transmission ratio while the clutch 217 is engaged to cause the third motor/pump unit to rotate at three times the speed of the output shaft through which it is driven. The engagement of the clutch is described in the following paragraph.

Valve section 123b always maintains a passageway between its left hand chamber and line 124 to clutch 217 no matter what the position of spool 123b–1. Valve section 123a is used as a pilot valve, rather than a flow control valve to supply charge pressure flow to clutch 217. As soon as cam 115 of valve 117 moves spool 119 upward, at ratios below 3:1, charge pressure is supplied to valve section 123a. Spool 123a–1 of section 123a is instantaneously displaced to the right by the application of charge pressure on line 121 and there is unrestricted flow of charge pressure from port 126 to the clutch 217 through sequence valve 123b. With spool 123a–1 displaced to the right and spool 123b–1 to the left with the bias of spring 123b–2, system pressure and flow from line 303 applied to valve 123b is blocked or may be restricted by the spool 123b–1 from line 120 connected to valve 123a. This momentarily halts the flow of system pressure over line 120 to the amplifier valve 60 and actuator 35 and prevents ratio change. As clutch 217 engages, say at 50 p.s.i. for example, there is a charge pressure buildup in line 124 which backs up into the left hand chamber of valve 123b. If spring 123b–2 is selected to move at a pressure higher than the clutch engaging pressure, say 100 p.s.i., spool 123b–1 will not move to the right to open the system pressure line to the actuator until the pressure in line 124 reaches this higher pressure of 100 p.s.i. Thus, the third motor/pump unit 213–3 is engaged during a time when there is no actuator movement and no transmission ratio change. Also, since the swashplate for motor 213–3 is at zero stroke at the 3:1 ratio, the clutch is engaged at this point. This prevents any sudden transmission ratio change during engagement of the third motor in braking so that the vehicle stability is increased.

B. *Retarder valve.*—The braking effect of the engine is further controlled by retarder valve 70 located in upshift system pressure line 40a connected to the actuator. Retarder valve 70 acts to restrict oil flow out of the actuator on line 40a to thereby control the downshifting rate. During engine braking, port 10 (FIGURE 2) is the high pressure port and port 11 the low pressure, since the drive shaft is turning the motors 213. The reverse porting arrangement may be used, if desired. As the actuator downshifts to 3:1, cam 115 engages clutching valve 117 so that clutch 217 is quickly engaged when spool 119 is moved upwardly enough to provide communication between ports 117e and 117f. Additional movement of the actuator continues upward movement of cam 115 and clutching valve spool 119 to open communication between ports 117b and 117c. This occurs at a transmission ratio of about 6:1, this ratio being produced shortly after the 3:1 ratio since third motor 213–3 is initially engaged with its swashplate in the neutral position. The swashplate 213–3a is increased to full stroke position so that motor 213–3 adds three torque units to the output through the gear multiplication.

With ports 117b and 117c connected, the high pressure port 10 of the transmission is connected over line 316, valve 117 and line 317 to the left hand side of retarder valve 70. The low pressure port 11 is connected directly to the right hand side of the retarder valve over line 318. Valve 70 receives system pressure from amplifier valve upshift output port 65b at its input 71. Spool 72 has a main passageway 73 and a number of branch passageways 74 which communicate with the valve output 75 when the valve is not actuated. In the unactuated condition there is unrestricted fluid flow between amplifier 60 and line 40a through passageways 73 and 74 which are located in the position shown in FIGURE 4.

Retarder valve spool 72 is preloaded to the left by a spring 76 and the system pressure in line 318. With the transmission in a ratio below 6:1 and the engine braking, the pressure in line 317 to the left hand end of the retarder valve begins to increase moving spool 72 to the right. This restricts communication between valve input and output ports 71 and 75 to restrict upshift oil flow in line 40a out of the actuator. Added braking pressure developed by greater engine braking increases the pressure in line 317 and moves spool 72 further to the right. As the oil flow out of line 40a is further restricted, the flow of oil from behind the right end of piston head 37 is further slowed down thereby slowing the downshift travel of piston 37 to the right. Maximum downshift retardation is obtained with spool 72 all the way to the right, the position of maximum restriction of oil flow out of line 40a.

As soon as the vehicle slows, thereby reducing braking pressure in line 317, spool 72 moves to the right due to the preload of spring 76 and the system pressure in line 318. This permits an unrestricted passageway to the upshift side of the actuator over line 40a. At transmission ratios above 6:1 clutching valve spool 119 closes the passageway between ports 117b and 117c to remove pressure from line 317 thereby inactivating valve 70. At ratios above 6:1 port 117b and line 317 is vented to case pressure through port 117a. It should be understood that the retarder valve 70 cannot be actuated when the engine is driving the vehicle, rather than the vehicle driving the engine as during braking, since the pressure in lines 317 and 318 is reversed thereby preventing the spool 72 from being moved to the right.

C. *Mode selector braking.*—Moving mode selector 500 to the FORWARD AUTO 2nd or FORWARD AUTO 3rd positions produces an automatic braking action. Spool 622 of valve 620 (FIG. 3) is held on the sloping portion 602a-2 of cam section 602. Cam section 57b (FIGURE 4) is moved by linkage 502 to apply more bias to spring 56 in the AUTO 2nd position and still more bias in the AUTO 3rd position with the effect that governor valve spool 54 encounters more resistance in moving to the right and the transmission finds it harder and harder to upshift.

With the mode selector 500 in normal AUTO FORWARD drive position the speed regulator 50 is preferably adjusted so that an upshifting signal is obtained at a predetermined prime mover speed, 1200 to 1500 r.p.m. for example. The transmission continues to upshift as long as r.p.m. exceeds 1200 to 1500 and engine is not lugged down below that speed, by vehicle loading, for that particular fuel throttle position. With the mode selector in the AUTO 2nd or AUTO 3rd position more spring bias is applied with the result that the transmission upshifts at higher and higher speeds, that is, remains in the downshift position for a longer period of time.

To illustrate the use of the braking provided by the AUTO 2nd and AUTO 3rd modes, consider the situation where the driver anticipates load conditions, as for instance off the road operation entailing a variety of loads, requiring precise maneuvering of the vehicle instead of economy of engine operation. This is accomplished by preventing the transmission from upshifting, that is, increasing the biasing of the speed regulator which keeps engine speed below the bias setting to stay in low ratio. In this way the natural tendency of the transmission to upshift is thwarted, in anticipation of variations in terrain (load) and the automatic control feature is extended to higher engine speed.

D. *Regenerative Braking.*—As indicated above, the biasing of spring 56 is varied by cam section 57a, connected to the throttle. Increased speed of the engine, as produced by increased throttle application, increases the bias and the downshift signal out of speed regulator 50.

Figure 6:
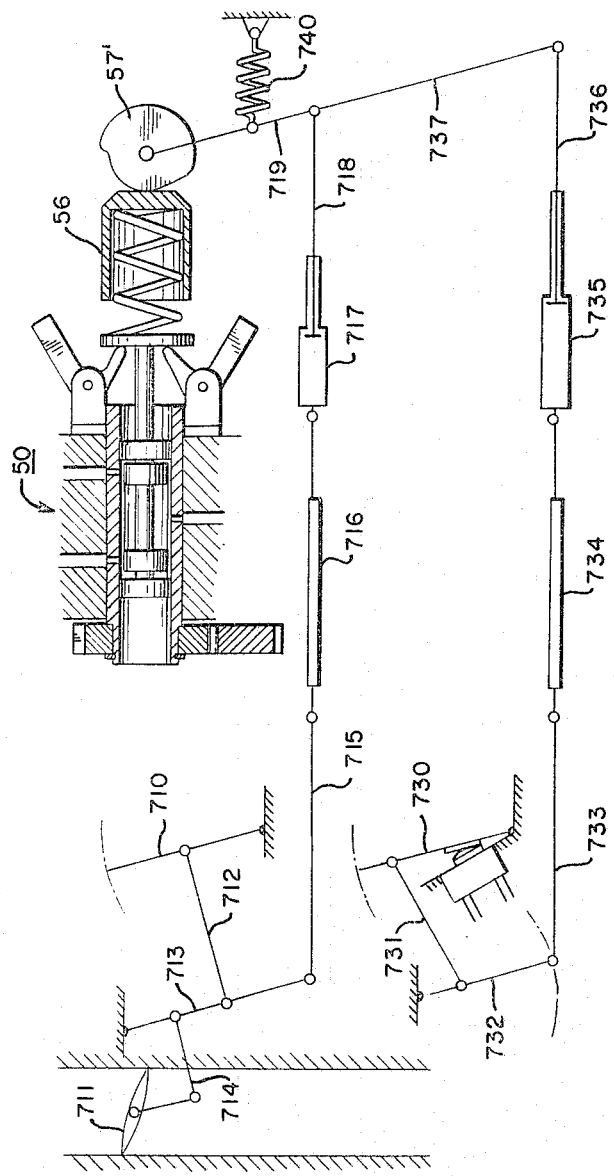
FIGURE 6 is a diagrammatic representation of the regenerative braking system.

FIGURE 6 shows another arrangement to vary the bias of speed regulator spring 56 to change the downshift mode of operation encountered with different vehicle driving requirements encountered in coasting and fast braking stops. Here the biasing of spring 56 is arranged to be varied either by the fuel throttle pedal 710 or a mechanical air brake pedal 730. Throttle 710 controls the engine induction butterfly 711 through a lever arm arrangement 712, 713 and 714, shown schematically. Lever 713 also connects to a lever 715 which is connected to a cam 57' engaging the follower 59 holding spring 56 through an adjusting cable 716, override 717, lever 718 and lever 719. Depressing pedal 710 turns cam 57' clockwise through the lever system to increase the bias and produce a downshift signal. The bias is selected to produce the proper transmission ratio for maximum fuel economy as explained previously. The operation of throttle pedal 710 produces the same effect as described for cam section 57a of FIGURE 4.

Pressure applied to the braking pedal 730 connected to a conventional service brake, such as an air brake, also actuates a lever linkage 731, 732, 733, adjusting cable 734, override 735, lever 736 and lever 719 to turn cam 57' clockwise to apply more bias to spring 56. This also increases the downshift signal out of speed regulator 50. This arrangement, with the two overrides 716 and 734, permits the braking pedal 730 to introduce a high downshift spring bias to regulator 50 even with high engine speed. The magnitude of this signal is directly proportional to the displacement of service brake pedal 730. This arrangement provides simultaneous downshift of the transmission with application of the service brake, effecting a dual braking action. The greater the service brake output the greater will be the transmission downshift. A spring 740 is also provided to return cam 57' to its normal position when neither of pedals 710 or 730 are depressed.

It should be understood that cam 57' of FIG. 7 can correspond to cam section 57a of FIG. 4 alone, since the two overrides 716 and 734 are provided. The latter permits section 57a to be operated by one or both of the pedals 710 or 730.

V. *Automatic reverse*

When mode selector lever 500 is placed in the AUTO REVERSE position, linkage 502 rotates cam 602 so that spool 622 rides on minimum diameter portion 602a-3 of cam 602. This keeps oil flowing to pressure governor 25 which operates in the manner previously described.

Moving mode selector lever 500 to AUTO REVERSE also covers linkage 502a to turn cam 606 (FIGURE 4) clockwise. This moves spools 661 and 671 of the respective reverse and reverse interlock valves 660 and 670 to the left against the bias of respective springs 662 and 672. The two spools 661 and 671 are connected by a common follower 665. Moving spool 661 to the left vents line 663, which was supplying system pressure from line 120 through valve 660 and over line 663 to the right hand end of actuator cylinder 38, to case pressure. At the same time spool 671 moves to the left and the center and right lands respectively block the upshift and downshift signals on lines 40 and 41 from amplifier valve input ports 60a and 60b. Spool 671 at the left-most position also vents the upshift input port 60a of valve 60 to case pressure through valve 670, line 665, and the vent port of valve 660. Reverse valve spool 661, in its left-most position, directs system pressure through valve 660 over line 666, through valve 670 and line 41 to the downshift input port 60b of spool 62 of amplifier valve 60 to move the amplifier spool to the extreme right.

In this position with spool 61 to the extreme right, amplifier valve 60 directs full system pressure through line 41a into the actuator against the left side of actuator piston head 37. Since there is no pressure in line 663 against the right side of cylinder 38, the system pressure in line 41a moves actuator piston head 37 and the entire cylinder 38 to the extreme right of housing 39 against the end cap. Any oil trapped between the right end of head 37 and the inside of the right end of cylinder 38 is vented to case pressure through the vent on valve 60 adjacent line 40a. In this position of the control system the actuator, actuator cams and cam followers change the pump swashplate angle from positive to negative while maintaining the swashplates of motor 213-1, 213-2 and 213-3 in a cam dwell position of 15 degrees.

With the mode selector lever 500 in AUTO REVERSE, a low gear ratio is produced. This ratio is slightly less than the low ratio in forward automatic drive. Due to the reverse rotation of the three motors 213 caused by the negative pump angle, the mechanical torque is not available. The pump negative swashplate angle can be changed from the full power rating of minus 7½ degrees to slightly less than 4 degrees to get the same low ratio in reverse as in forward. The cam and follower for the pump swashplate are therefore designed to cause the pump to change position and stop at approximately 7½ to 8 degrees negative angle.

It should be noted that there is no automatic control of the transmission in reverse since the interlock reversing valve 670 shunts the speed regulator output signals. Therefore, the transmission stays in the low ratio. Also, as the transmission is shifted into the reverse mode, a reverse interlock cam 681 (FIGURE 4) is actuated by the actuator linkage 36a when cylinder 38 moves near its right-most limits. Cam 681 is turned clockwise so that its follower 682 holds spool 671 of the interlock reversing valve 670 to the left. Spool 671 cannot return to the right until the transmission is taken out of AUTO REVERSE MODE and the actuator has reached a predetermined point in its travel out of reverse mode, namely, when cylinder 38 moves to near its left-most position, to disengage from cam 681.

Consider now the situation where mode selector 500 is first shifted from AUTO REVERSE to AUTO FORWARD. In doing this, cam 606 (FIGURE 4) is returned to the position shown. However, the spool of the interlock reverse valve 670 is held in the displaced position to the left by the interlock cam 681 for as long as the actuator is in the reverse position. When mode selector 500 is moved into FORWARD AUTO position rotation of cam 606 causes the spool 661 of reverse valve 660 to move toward the right. This directs system pressure over line 663 to the right hand end of the actuator chamber and it simultaneously permits the input port 60b of the downshift side of the amplifier valve, whose spool 61 is to the extreme right, to be vented to case pressure over line 41, through the interlock reverse valve 670 (which is still to the left), line 666 and through the left vent of reversing valve 660. System pressure is now applied to upshift input port 60a from line 120, valve 660 and line 665. This moves spool 61 of valve 60 to the left so that system pressure is applied to line 41a.

With pressure in the right hand end of actuator cylinder 38 from line 663, no pressure at the downshift side output of the amplifier valve 60, since port 60a is vented, and pressure from line 40a between the piston head and the cylinder 38, the entire actuator assembly comprising the movable piston head 37, cylinder 38 and the actuator arm 36 is moved towards the left to a position where the cylinder 38 is bottomed against the left end cap of housing 39, as shown in FIGURE 4. In this position we have normal forward drive.

When the movable cylinder 38 approaches its final stop position at the left end of housing 39 the interlock cam 681 is rotated by the actuator linkage 36a enabling the interlock reversing valve 670 to be dropped off. As the interlock reversing valve 670 is dropped off, its spool 671 moves to the right to the position shown in FIGURE 4 to reestablish the normal forward automatic drive by allowing the speed regulator 50 output signals on lines 40 and 41 to be directed to the amplifier valve 60. This provides an unrestricted passageway to the amplifier valve 60 from speed regulator 50 and the interlock reversing valve 670 and the reverse valve 660 are no longer effectively in the system.

In all cases during AUTO REVERSE the pressure governor 25 is in the circuit so that the transmission does not engage until the speed of the prime mover reaches 700 r.p.m. or above.

VI. *Push start*

Since it is very difficult to start an engine in low ratio because of the power required to push the vehicle against the reverse force of low transmission ratio, the normal position of the servo system must be altered so that the transmission can be upshifted without the benefit of the speed regulator.

The transmission is placed into the PUSH START mode by displacing the selector lever 500 beyond NEUTRAL in the right hand side of the shift pattern (FIGURE 5). The selector lever 500 is preferably spring loaded between NEUTRAL and PUSH START and tends to return to NEUTRAL so that the driver must hold the lever in the PUSH START position. Of course, this spring loading arrangement is not absolutely necessary.

As lever 500 is moved past NEUTRAL to PUSH START, linkage 502 causes spool 622 of valve 620 to ride off the highest part 602a-1 (NEUTRAL) of cam section 602a to intermediate height portion 602a-4 so that spool 622 can move half way to the left from the position shown as biased by spring 623. Displacement of spool 622 in this manner connects line 313 to line 313a. This still maintains the hydraulic lock on the engaging valve 15. The partial movement of spool 622 also directs control pressure from restrictor 2, through valve 620 and over line 625 to valve 686 to the case pressure vent of port 688 and closes the port 624a leading to the pressure regulator 25.

Lever 500 in the PUSH START position also turns cam 605 (FIGURE 4) through linkage 502 so that spool 62 of amplifier valve 60 is moved to the left. This vents downshift line 41a to case pressure via the vent port of valve 60 adjacent the input to line 41a. At the same time system pressure in line 108a is directly applied through input port 64a to upshift line 40a. This effectively overrides the subsequent output signals from speed governor 50 after the engine is rotated.

As the vehicle is pushed the motors 213 act as pumps and the pump 212 acts as a motor. As indicated above, the secondary charge pump also begins to develop pressure and the instant this pressure is sufficient, it begins to upshift the transmission since the pressure input to line 41a is open. Upshift continues rapidly since there is no downshift pressure in line 40a acting against the left side of piston head 37.

Engaging valve 15 is open to bypass pressure until the transmission upshifts to a 3:1 ratio. At this point actuator linkage 36a rotates cam 685 (FIGURE 3) to a position where the spool 687 of valve 686 is permitted to move to the left with the bias of spring 689. This closes line 625 from the vent 688 so that control pressure now passes over line 1a to the engaging valve 15 and at the same time opens the hydraulic lock on the opposite side of valve 15 to permit spool 15 to move towards the left to close the bypass. Pressure governor 25 is inoperative and still out of the circuit since the line from orifice 2 is blocked by spool 622. The pump/motor unit is caused to rotate which in turn rotates the planetary gear train (FIG. 1) and the prime mover for the starting cycle. The transmission continues to upshift as the actuator moves to the left towards 1:1 or higher ratio thereby making the engine easier to start.

As the vehicle is pushed, the motor/pump units 213 displace oil to the pump/motor unit 212. However, no rotation of pump/motor unit 212 is effected until the engaging valve 15 is closed permitting the transmission driveshaft to receive fluid. When the pump/motor unit 212 receives oil flow from units 213, it causes the ring gear 208 to rotate in the same direction as during REVERSE mode. Rotation of ring gear 208 rotates planetary gear carrier to drive the sun gear 206 and the input shaft 200 in the proper direction to start the engine.

As soon as the engine is started the driver releases selector lever 500 to place the mode selector in NEUTRAL or places the lever in AUTO FORWARD. This turns cam 605 to the position shown in FIGURE 4 so that the speed governor 50 reassumes control of amplifier valve 60. Returning lever 500 to NEUTRAL or AUTO FORWARD turns cam section 602a to the position shown. With the engine started the mode selector 500 may be returned to NEUTRAL. Valve 620 now vents line 625 to case pressure through port 624 and reestablishes the hydraulic lock to keep valve 16 open. The hydraulic lock is maintained for valve 15 in the manner previously described for the NEUTRAL mode of operation.

For normal AUTO FORWARD drive mode the valve 620 is returned to the position shown in FIG. 3 with the interlock push start valve 686 in the extreme left position. Lines 313 and 625 are blocked by the spool 622 and the line from orifice 2 to the pressure governor 25 is open for normal engagement operation of engagement valve 15. Interlock valve 686 action can no longer influence the normal engaging cycle. Also the hydraulic lock produced by blocking line 313 is open to vent port 624 so that spool 16 of engaging valve 15 is free to move. In both cases valve 686 is made ineffective so the engagement of interlock cam 685 is of no consequence. Cam 685 drops off to the position shown when the trasmission downshifts below a 3:1 ratio.

VII. Tow

When the mode selector 500 is placed in the TOW position, on the left hand leg of the shaft pattern (FIGURE 5), it is desirable to maintain disengagement of the hydraulic components and to circulate a minimum amount of oil; maintain the engaging valve 15 in the disengaged position; and upshift the actuator 35 to achieve as high a gear ratio as possible. Lever 500 is not spring biased in this mode as it is in PUSH START mode.

In TOW position, linkage 502a turns cam section 605b of cam 605 (FIGURE 4) to move follower 67 and amplifier spool 62 to the left. This upshifts the actuator 35, by venting the downshift line 41a to case pressure and connecting the upshift line 40a to system pressure as in the PUSH START mode, to achieve the high ratio needed for easy towing. Linkage 502a also turns cam section 602a of cam 602 (FIGURE 3) to engage spool 622 to move it to the same position as in the NEUTRAL mode to vent the control pressure to case pressure through valve 620 and remove governor 25 from operation. This also produces the hydraulic lock for valve 15 described with respect to the NEUTRAL mode.

With these conditions established, as the vehicle is towed to drive the output shaft and secondary charge pump, pressure is developed in line 41a to cause the transmission to upshift to 1:1 with engaging valve 15 open. At 1:1 ratio the motor swashplates are positioned by the cam program towards the overdrive position so that these motors 213 being driven as pumps deliver minimum oil flow to the pump 212 acting as a motor. Since little fluid is recirculated in the power transmitting system between ports 10 and 11, minimum tow resistance is presented.

VIII. Manual forward and reverse

Moving selector lever 500 to "MANUAL FORWARD" or "MANUAL REVERSE" causes cam sections 601a and 601b of cam 601 (FIGURE 3) to be respectively operated by linkages 502 and 502a to engage follower 611 and move spool 612 of valve 610 to the left against the bias of a spring 613. This shuts off control pressure flow to governor 25 and permits the control pressure in line 1a to pass directly to the right hand end engaging valve 15. Therefore, the transmission engages without the necessity of having the prime motor come up to the actuating speed (700 r.p.m.) of the governor 25. In manual mode the shift lever 500 also preferably applies full braking bias to spring 56 via cam section 57b so that the speed regulator 50 can never produce an upshift signal. This keeps the transmission in a low ratio.

While a preferred embodiment of the invention has been described above it will be understood that this embodiment is illustrative only and the invention is to be limited solely by the appended claims.

What is claimed is:
1. In a control system for an infinitely variable hydrostatic transmission of the type having pump and motor units with interconnecting fluid pressure and return conduits and an associated prime mover the combination comprising:
   a speed governor driven by the prime mover at a speed proportional to the prime mover speed, said governor having a pair of output ports to produce a pressure gradient signal at the output ports which varies as a function of prime mover speed,
   actuator means for connection to the pump and motor units to vary the fluid displacement thereof and thereby change the ratio of the transmission,
   amplifier valve means connected between said governor and said actuator means and responsive to the pressure gradient signal to produce a signal to change the ratio of the transmission,
   and means connected between said actuator means and said speed governor means for applying a feedback signal to said governor of a character to cause said governor to produce a pressure gradient signal opposite in character to the pressure gradient signal producing the ratio change of the transmission.

2. In a control system for an infinitely variable hydrostatic transmission of the type having pump and motor units with interconnecting fluid pressure and return conduits and an associated prime mover the combination comprising:
   a speed governor driven by the prime mover at a speed porportional to the prime mover speed, said governor having a pair of output ports and a movable spool to produce a pressure gradient signal at the output ports which varies as a function of prime mover speed,
   actuator means for connection to the pump and motor units to vary the fluid displacement thereof and thereby change the ratio of the transmission,
   amplifier valve means connected between said governor and said actuator means and responsive to the pressure gradient signal to produce a signal to change the ratio of the transmission,
   and a linkage connected between said amplifier valve and said governor to position the spool of the governor with respect to the output ports to produce a pressure gradient signal opposite in character to the pressure gradient signal producing the transmission ratio change.

3. In a control system for an infinitely variable hydrostatic transmission of the type having pump and motor units with interconnecting fluid pressure and return conduits and as associated prime mover the combination comprising:
   a speed governor driven by the prime mover at a speed proportional to the prime mover speed, said governor having a pair of output ports to produce a pressure gradient signal at the output ports which varies as a function of prime mover speed,
   actuator means for connection to the pump and motor units to vary the fluid displacement thereof and thereby change the ratio of the transmission,
   amplifier valve means connected between said governor and said actuator means and responsive to the pressure gradient signal to produce a signal to change the ratio of the transmission,
   and means connected between said actuator means and said amplifier valve means to selectively retard the effect of a signal from said amplifier valve means for changing the ratio of the transmission in the downshift direction.

4. A control system as set forth in claim 3 wherein said retarding means comprises a retarder valve located between said amplifier valve means and said actuator means, and means connected to the fluid pressure conduit for actuating the retarder valve to control the rate of change of the transmission in the downshift ratio direction in response to the system pressure.

5. In a control system for an infinitely variable hydrostatic transmission of the type having pump and motor units with interconnecting fluid pressure and return conduits and an associated prime mover the combination comprising:
   a speed governor driven by the prime mover at a speed proportional to the prime mover speed, said governor having a pair of output ports to produce a pressure gradient signal at the output ports which varies as a function of prime mover speed,
   actuator means for connection to the pump and motor units to vary the fluid displacement thereof and thereby change the ratio of the transmission,
   amplifier valve means connected between said governor and said actuator means and responsive to the pressure gradient signal to produce a signal to change the ratio of the transmission,
   a linkage connected between said amplifier valve and said governor to position the spool of the governor with respect to the output ports to produce a pressure gradient signal opposite in character to the pressure gradient signal producing the transmission ratio change,
   a retarder valve connected between said amplifier valve means and said actuator means for controlling the rate of change of the transmission in the downshift ratio direction,
   and means connecting said retarder valve to one of said fluid conduits to operate the retarder valve in response to the system pressure.

6. In a control system for an infinitely variable hydrostatic transmission of the type having pump and motor units with interconnecting fluid pressure and return conduits and an associated prime mover the combination comprising:
   a speed governor driven by the prime mover at a speed proportional to the prime mover speed, said governor having a pair of output ports and a movable spool to produce a pressure gradient signal at the output ports which varies substantially linearly as a function of prime mover speed,
   fluid operated actuator means for connection to the pump and motor units to vary the fluid displacement thereof and thereby change the ratio of the transmission,
   amplifier valve means connected between said governor and said actuator means to control the fluid flow to said actuator means in response to the pressure gradient signal from the governor to control the ratio of the transmission,
   and means connecting said amplifier valve means to one of said fluid conduits to operate said amplifier valve and said actuator means in response to system pressure.

7. In a control system for an infinitely variable hydrostatic transmission of the type having pump and motor units with interconnecting fluid pressure and return conduits and an associated prime mover the combination comprising:
   a speed governor driven by the prime mover at a speed proportional to the prime mover speed, said governor having a pair of output ports and a movable spool to produce a pressure gradient signal at the output ports which varies substantially linearly as a function of prime mover speed,
   fluid operated actuator means for connection to the pump and motor units to vary the fluid displacement thereof and thereby change the ratio of the transmission,
   amplifier valve means connected between said governor and said actuator means to control the fluid flow to said actuator means in response to the pressure gradient signal from the governor to control the ratio of the transmission,
   means connecting said amplifier valve means to one of said fluid conduits to operate said amplifier valve and said actuator means in response to system pressure,
   and means connected between said amplifier valve means and said governor and responsive to the operation of the amplifier valve for providing negative feedback to said governor.

8. In a control system for an infinitely variable hydrostatic transmission of the type having pump and motor units with interconnecting fluid pressure and return conduits and an associated prime mover the combination comprising:
   a speed governor driven by the prime mover at a speed proportional to the prime mover speed, said governor having means for producing an output signal which varies linearly as a function of input speed,
   actuator means for connection to the pump and motor units to vary the fluid displacement thereof and thereby change the ratio of the transmission,
   amplifier means connected between said governor and said actuator means and responsive to the governor output signal for controlling the actuator to change the ratio of the transmission,
   clutch means for controlling the engagement of one of the pump and motor units with the transmission,
   valve means operated by said actuator means to engage said clutch to engage the pump and motor unit with the transmission without initially effecting a simultaneous ratio change of the transmission.

9. In a control system for an infinitely variable hydrostatic transmission of the type having pump and motor units with interconnecting fluid pressure and return conduits and an associated prime mover the combination comprising:
   a speed governor driven by the prime mover at a speed proportional to the prime mover speed, said governor having means for producing an output signal which varies linearly as a function of input speed,
   fluid operated actuator means for connection to the pump and motor units to vary the fluid displacement thereof to thereby change the ratio of the transmission,
   a source of fluid under pressure,
   amplifier valve means connected between said governor and said actuator means and to said source of fluid to control the fluid flow to said actuator means in response to the governor output signal for controlling the actuator to change the ratio of the transmission,
   clutch means for controlling the engagement of one of the pump and motor units with the transmission,
   valve means connected between said source of pressure and said amplifier valve means and actuated by said actuator means at a predetermined transmission ratio to disable the fluid flow to said amplifier valve means and to said actuator means to prevent transmission ratio change while applying fluid to the clutch to cause the clutch to engage the pump and motor unit with the transmission.

10. In a control system for an infinitely variable hydrostatic transmission of the type having pump and motor with interconnecting fluid pressure and return conduits and an associated prime mover the combination comprising:
   a speed governor driven by the prime mover at a speed proportional to the prime mover speed, said governor including means responsive to the prime mover speed to produce an output signal which varies as a function of the prime mover speed,
   actuator means for connection to the pump and motor units to vary the fluid displacement thereof and thereby change the ratio of the transmission, amplifier valve means connected between said governor and said actuator means and responsive to the governor output signal to change the ratio of the transmission, means for controlling the speed of the prime mover, control means connected to said prime mover speed controlling means and operated thereby for varying the response of said governor to the prime mover speed to vary the governor output signal in accordance with a predetermined function, and braking means connected to said control means and operating said control means when actuated to vary the governor output signal in a direction to produce downshifting of the transmission ratio by the actuator means.

11. A control system as set forth in claim 10 further comprising override means between said braking means and said prime mover speed control means to disable one of said braking and speed control means from operating said control means in response to operation of the other of said braking and speed control means.

12. In a control system for an infinitely variable hydrostatic transmission of the type having pump and motor units with interconnecting fluid pressure and return conduits and an associated prime mover the combination comprising:

a speed governor driven by the prime mover at a speed proportional to the prime mover speed, said governor including means responsive to the prime mover speed to produce an output signal which varies as a function of the prime mover speed, actuator means for connection to the pump and motor units to vary the fluid displacement thereof and thereby change the ratio of the transmission, amplifier valve means connected between said governor and said actuator means and responsive to the governor output signal to change the ratio of the transmission, control means for varying the response of said governor to vary the governor output signal in accordance with a predetermined function, and braking means connected to said control means and operating said control means when actuated to vary the governor output signal in a direction to produce downshifting of the transmission ratio by the actuator means.

13. In a control system for an infinitely variable hydrostatic transmission of the type having pump and motor units with interconnecting fluid pressure and return conduits and an associated prime mover the combination comprising:

a speed governor driven by the prime mover at a speed proportional to the prime mover speed, said governor having a pair of output ports to produce a pressure gradient signal at the output ports which varies as a function of prime mover speed, actuator means for connection to the pump and motor units to vary the fluid displacement thereof and thereby change the ratio of the transmission, amplifier valve means connected between said governor and said actuator means and responsive to the pressure gradient signal to produce a signal to change the ratio of the transmission, means connected between said actuator means and said speed governor means for applying a feedback signal to said governor of a character to cause said governor to product a pressure gradient signal opposite in character to the pressure gradient signal producing the ratio change of the transmission.

means connected between said actuator means and said amplifier valve means to selectively retard the effect of a signal from said amplifier valve means for changing the ratio of the transmission in the downshift direction, clutch means for controlling the engagement of one of the pump and motor units with the transmission, valve means operated by said actuator means to engage said clutch to engage the pump and motor units with the transmission without initially effecting a simultaneous ratio change of the transmission.

14. In a control system for an infinitely variable hydrostatic transmission of the type having pump and motor units with interconnecting fluid pressure and return conduits and an associated prime mover the combination comprising:

a speed governor driven by the prime mover at a speed proportional to the prime mover speed, said governor having a pair of output ports and a movable spool to produce a pressure gradient signal at the output ports which varies as a function of prime mover speed, actuator means for connection to the pump and motor units to vary the fluid displacement thereof and thereby change the ratio of the transmission, amplifier valve means connected between said governor and said actuator means and responsive to the pressure gradient signal to produce a signal to change the ratio of the transmission, a linkage connected between said amplifier valve and said governor to position the spool of the governor with respect to the output ports to produce a pressure gradient signal opposite in character to the pressure gradient signal producing the transmission ratio change, a retarder valve connected between said amplifier valve means and said actuator means for controlling the rate of change of the transmission in the downshift ratio direction, means connecting said retarder valve to one of said fluid conduits to operate the retarder valve in response to the system pressure, means connecting said amplifier valve means to one of said fluid conduits to operate said amplifier valve and said actuator means in response to system pressure, clutch means for controlling the engagement of one of the pump and motor units with the transmission, and valve means operated by said actuator means to engage said clutch to engage the pump and motor units with the transmission without initially effecting a simultaneous ratio change of the transmission.

15. In a control system for an infinitely variable hydrostatic transmission of the type having pump and motor units with interconnecting fluid pressure and return conduits and an associated prime mover the combination comprising:

a speed governor driven by the prime mover at a speed proportional to the prime mover speed, said governor having a pair of output ports to produce a pressure gradient signal at the output ports which varies as a function of prime mover speed, actuator means for connection to the pump and motor units to vary the fluid displacement thereof and thereby change the ratio of the transmission, amplifier valve means connected between said governor and said actuator means and responsive to the pressure gradient signal to produce a signal to change the ratio of the transmission, means connected between said actuator means and said speed governor means for applying a feedback signal to said governor of a character to cause said governor to produce a pressure gradient signal opposite in character to the pressure gradient signal producing the ratio change of the transmission, control means for varying the response of said governor to vary the governor output signal in accordance with a predetermined function, and braking means connected to said control means and operating said control means when actuated to vary the governor output signal in a direction to produce downshifting of the transmission ratio by the actuator means.

References Cited by the Examiner

UNITED STATES PATENTS 3,225,618  12/1965  Page _____ 74—472.1

DAVID J. WILLIAMOWSKY, *Primary Examiner.*

A. T. McKEON, *Assistant Examiner.*